(12) United States Patent
Ulmer et al.

(10) Patent No.: US 7,386,785 B2
(45) Date of Patent: Jun. 10, 2008

(54) AUTOMATIC ELECTRONIC TIMESHEET FILLER

(75) Inventors: Cédric S. P. Ulmer, Nice (FR); Pascal T. C. Spadone, Antibes (FR); Cédric R. J. Hébert, Mouans-Sartoux (FR); Laurent Y. Gomez, Le Cannet (FR); Maarten E. Rits, Sophia Antipolis (FR)

(73) Assignee: SAP AG, Walldorf (DE)

( * ) Notice: Subject to any disclaimer, the term of this patent is extended or adjusted under 35 U.S.C. 154(b) by 698 days.

(21) Appl. No.: 10/929,255

(22) Filed: Aug. 30, 2004

(65) Prior Publication Data
US 2006/0047548 A1    Mar. 2, 2006

(51) Int. Cl.
G06F 17/00 (2006.01)
(52) U.S. Cl. ............... 715/226; 715/225; 715/963; 707/E17.064
(58) Field of Classification Search ............ 706/21, 706/47; 715/507, 508, 963; 705/32, 8; 707/E17.064
See application file for complete search history.

(56) References Cited

U.S. PATENT DOCUMENTS

| | | | | |
|---|---|---|---|---|
| 5,371,807 A * | 12/1994 | Register et al. | ........... | 382/159 |
| 5,555,364 A * | 9/1996 | Goldstein | ........... | 715/797 |
| 6,049,776 A * | 4/2000 | Donnelly et al. | ........... | 705/8 |
| 6,141,649 A * | 10/2000 | Bull | ........... | 705/11 |
| 6,157,923 A * | 12/2000 | Ivler et al. | ........... | 707/3 |
| 6,747,679 B1 * | 6/2004 | Finch et al. | ........... | 715/777 |
| 6,750,885 B1 * | 6/2004 | Finch et al. | ........... | 715/777 |
| 6,751,650 B1 * | 6/2004 | Finch et al. | ........... | 709/203 |
| 6,753,884 B1 * | 6/2004 | Finch et al. | ........... | 715/762 |
| 7,054,860 B2 * | 5/2006 | Inaba et al. | ........... | 707/5 |
| 7,069,498 B1 * | 6/2006 | Finch et al. | ........... | 715/503 |
| 2002/0069145 A1 * | 6/2002 | Collado et al. | ........... | 705/32 |

OTHER PUBLICATIONS

Curtis Finch II, Method and Apparatus for Wireless Web Time and Expense Entry with a Calendar Program/Personal Organizer (Non published U.S. Appl. No. 09/606,386), filed Jun. 29, 2000, pp. 1-61.*
Spherical Technology Inc., "Timesheet, Time Tracking & Project Management Timesheet Software", 2003, [online], [retrieved on Nov. 30, 2004] Retrieved from the Sherical Technology Inc. website using Internet <URL: http://www.sphericaltech.com/NewVersion.asp>.
Microsoft Inc., "Microsoft Office Assistance: Five ways to coordinate your staff's time off", 2004, [online], [retrieved on Dec. 2, 2004] Retrieved from the Microsoft Inc. website using Internet <URL: http://office.microsoft.com/en-us/assistance/HA010348051033.aspx>.

* cited by examiner

*Primary Examiner*—Kieu D Vu
*Assistant Examiner*—Nicholas S Ulrich
(74) *Attorney, Agent, or Firm*—Schwegman, Lundberg & Woessner, P.A.

(57) ABSTRACT

A method for automatically filling an electronic timesheet includes extracting one or more calendar entries from an electronic calendar and matching each calendar entry of the one or more calendar entries to a corresponding project of a list of projects. An electronic timesheet is then filled based on each calendar entry matched with the corresponding project.

15 Claims, 12 Drawing Sheets

FIG. 1
(PRIOR ART)

*ISP PUBLIC/Time Sheet: Data Entry View*

Please read the complete documentation (i-button)

Personnel number: 1234567 Pascal Spadone  Cost Ct.: 987654321 AP&AC
Data entry period: 12.07.2004 - 18.07.2004  Week: 29.2004

Data entry section

| Rec. order | Network | Acti. | Typ | Name | Un | Total | MO 12... | TU 13.07 | WE 14... | TH 15.07 | FR 16.07 | SA 17.07 |
|---|---|---|---|---|---|---|---|---|---|---|---|---|
| | | | | Planned work in days | | 4,00 | 20 | 20 | 20 | 20 | 20 | 20 |
| | | | | Total hours (from CATSXT) | H | 0,00 | 1,00 | 1,00 | 0,00 | 1,00 | 1,00 | 0,00 |
| | | | | Total days (from CAT2/CATW) | T | 4,00 | 0,00 | 0,00 | 0,00 | 0,00 | 0,00 | 0,00 |
| | | | | Total in days | T | 4,00 | 1,00 | 1,00 | 0,00 | 1,00 | 1,00 | 0,00 |
| | | ABSE | | Absence | T | | | | | | | |
| | | ADMN | | Administration | T | | | | | | | |
| | | DEV | | Information Developement | T | | | | | | | |
| 7422270 | | DEVL | | e-Justice (EU) | T | 4,00 | 1,00 | 1,00 | 0,00 | 0,00 | 1,00 | |
| | | EDUC | | Further Training | T | | | | | | | |
| | | MAIN | | Product Maint./Correction | T | | | 1,00 | | 1,00 | | |
| | | MESS | | Message Handling | T | | | | | | | |
| | | PMGT | | Product Management | T | | | | | | | |
| | | QMGT | | Quality Management | T | | | | | | | |
| | | TRSL | | Translation service | T | | | | | | | |
| | | VACA | | Vacation | T | | | | | | | |

Entry 1 of 15

350

| PROJECT # (ID) | |
|---|---|
| | Si |
| W1 NAME OF PROJECT | .5 |
| W2 KEYWORDS | .2 |
| W3 DURATION | |
| W4 PARTICIPANTS | |
| W5 LOCATION | |

TO: USER
FROM: AUTO TIMESHEET FILLER

[ CORRECT ] —520

TEXT

| DAY | PROJECT # | HOURS |
|---|---|---|
| MONDAY | 10000 | 6.5 |
| MONDAY | 11000 | 1.5 |
| TUESDAY | 10000 | 8.0 |

AUTOMATIC ELECTRONIC TIMESHEET FILLER

FIELD OF THE INVENTION

The present invention relates to electronic timesheets and more particularly to methods and systems that facilitate time entry of electronic timesheets.

BACKGROUND OF THE INVENTION

Numerous computer applications are available for tracking details of an employee's activities. These activities can include projects that the employee works on and the amount of time spent on each project. FIG. 1 is a screenshot 10 of a typical electronic timesheet. As used herein, a "screenshot" is an image displayed on a screen of a personal computer workstation or the like, at a particular point in time. Included in screenshot 10 are days of the work week 20, projects/categories 30, employee identification 40 and time entry period 50. In practice, an employee enters the number of worked hours into the appropriate box. For example, box 60 indicates that 1 hour was spent on the "e-Justice" project on Monday.

Somewhat similar in concept is a calendar computer application such as the one depicted in FIG. 2. FIG. 2 is a typical prior art screenshot 70 of an electronic calendar. Similar to screenshot 10, screenshot 70 includes days 80 of a workweek. In contrast, screenshot 70 is further divided into time segments 90. To block out time for a meeting or other activity, a user can enter the appropriate information to a block of time. This information can typically include a subject of the meeting, participants, location and duration. For example, calendar entry 100 is a presentation on ergonomics, takes place in the "St. Paul" conference room and will occur on Monday, July 15 from 3 p.m.-5 p.m.

Very often, time entries of screenshot 10 have a one-to-one correspondence to calendar entries of screenshot 70. That is, a calendar entry that pertains to a meeting regarding a specific project will very likely also be entered into a timesheet application since the duration of the meeting is accounted for in the timesheet application. As a result, information is being duplicated. First an employee enters a meeting in their calendar and then needs to re-enter essentially the same information in the electronic timesheet.

As a result of the above situation, there is a need for methods and systems to automatically fill a timesheet application based on a corresponding electronic calendar.

SUMMARY OF THE INVENTION

The present invention is described and illustrated in conjunction with systems, apparatuses and methods of varying scope. In addition to the aspects of the present invention described in this summary, further aspects of the invention will become apparent by reference to the drawings and by reading the detailed description that follows.

A method for automatically filling an electronic timesheet, in accordance with an embodiment of the present invention, includes extracting one or more calendar entries from an electronic calendar and matching each calendar entry of the one or more calendar entries to a corresponding project of a list of projects. An electronic timesheet is then filled based on each calendar entry matched with the corresponding project.

A system for an automatic electronic timesheet filler, in accordance with another embodiment of the present invention, includes an electronic calendar containing one or more calendar entries and an electronic timesheet for recording time entries pertaining to one or more projects. Also included is the automatic electronic timesheet filler that retrieves the one or more calendar entries, matches each calendar entry of the one or more calendar entries to a corresponding project of the one or more projects and fills the electronic timesheet based on the matched calendar entry and corresponding project.

A method for automatically filling an electronic timesheet, in accordance with a final embodiment of the present invention, includes extracting one or more calendar entries from an electronic calendar and matching each calendar entry of the one or more calendar entries to a corresponding project of a list of projects. The electronic timesheet is filled based on each calendar entry matched with the corresponding project and a snapshot of the electronic timesheet is taken. The electronic timesheet is verified and corrected if the electronic timesheet is not accurate. An additional snapshot of the electronic timesheet is then taken and compared to the first snapshot. Finally, weights of one or more keywords are adjusted if a difference between the two snapshots exists.

Embodiments of the present invention contemplates a variety of methods and systems for providing an automatic electronic timesheet filler. By retrieving individual calendar entries from an electronic calendar, keywords contained in the entries can be matched up with an appropriate project. Based on the match and duration of the calendar entry, the electronic timesheet can then be filled. Additional embodiments can include allowing a user to check the accuracy of the match, attend to incorrect matches and allow the timesheet filler to learn from the corrections. In this manner, the matching of calendar entries to the correct project will increase in accuracy. The present invention therefore provides a valuable, timesaving tool for an employee to merely enter time spent on a project only once. By then exporting the entries to the electronic timesheet, the employee is free to do more productive activities. Various embodiments will now be described in detail.

Embodiments of the invention presented are exemplary and illustrative in nature, rather than restrictive. Other embodiments and their equivalents will become apparent to those skilled in the art upon a reading of the specification and a study of the various figures of the drawing.

BRIEF DESCRIPTION OF THE DRAWINGS

FIG. 1 is a screenshot of a typical electronic timesheet;

FIG. 6 is a block diagram illustrating weighted keywords of a project, in accordance with the present invention;

FIG. 8 is an example of an email message used to correct a filled-in electronic timesheet, in accordance with an embodiment of the present invention;

DETAILED DESCRIPTION OF THE INVENTION

Figure 2:
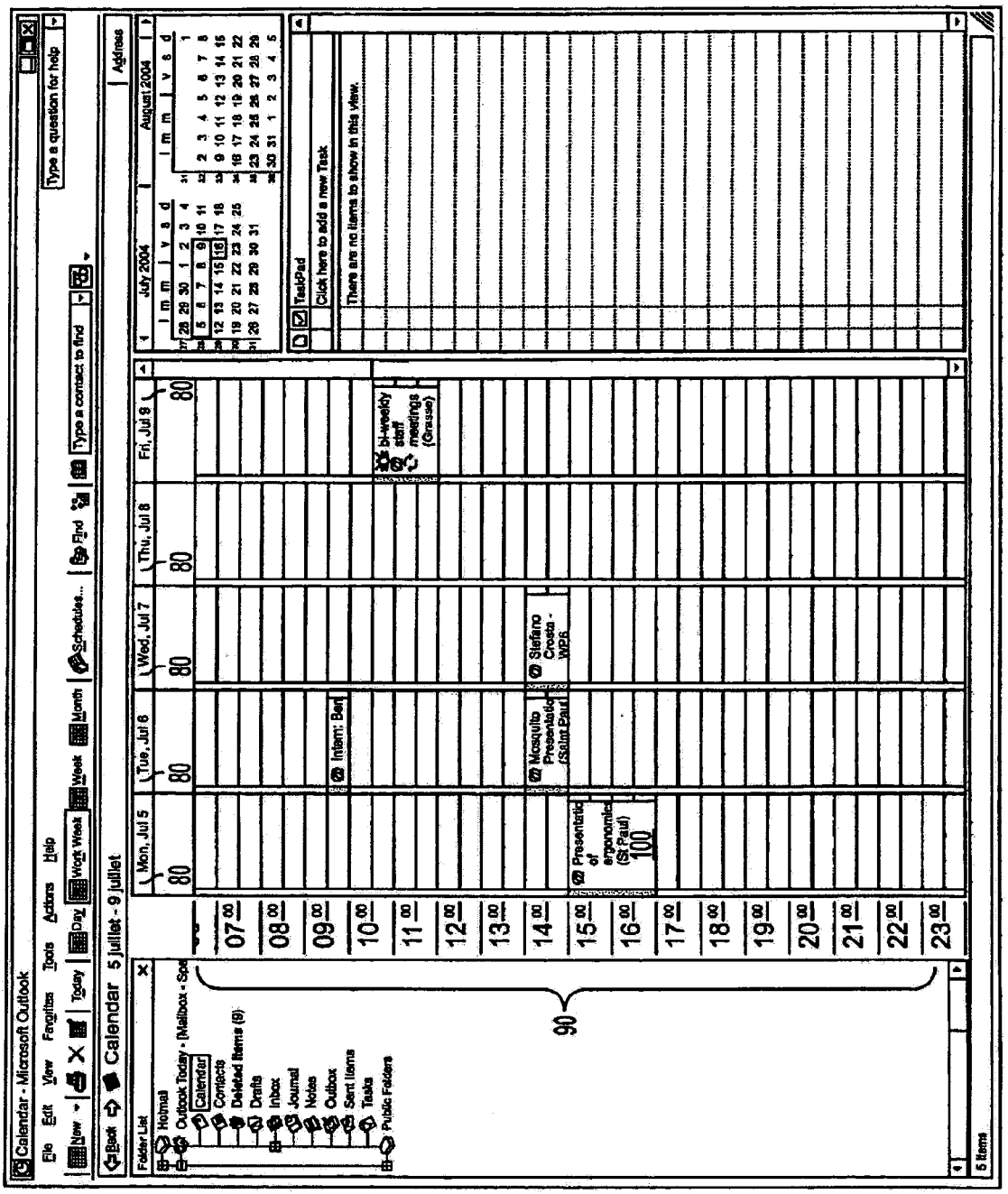
FIG. 2 is a typical prior art screenshot of an electronic calendar.
Figure 3:
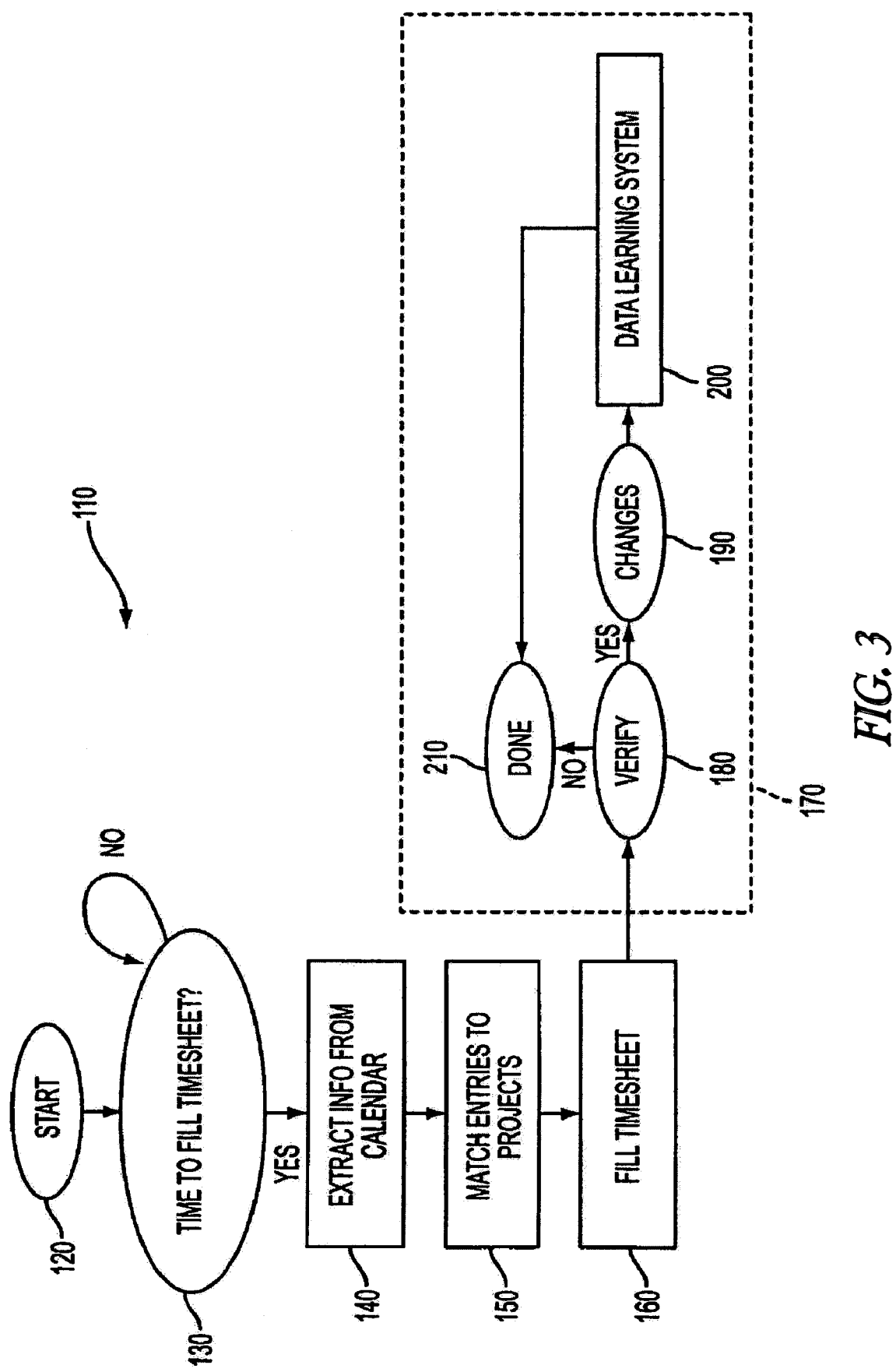
FIG. 3 is a flowchart illustrating a method of automatically filling an electronic timesheet, in accordance with the present invention.

FIGS. 1-2 were discussed with reference to the related art. FIG. 3 is a flowchart illustrating an exemplary method 110 of automatically filling an electronic timesheet, in accordance with an embodiment the present invention. After a start operation 120, it is determined if it is time to fill-in a timesheet at an operation 130. Typically, operation 130 could occur on a weekly or a daily basis—depending on the preferences of, for example, an employee. If it is not time to fill-in the timesheet, the next operation will not commence until it is time. Alternatively, operation 130 could be manually initiated by an employee.

Once the appointed time occurs, calendar entries are extracted from an electronic calendar at operation 140. The extracted calendar entries are then matched up to corresponding projects at operation 150. Matching operation 150 can be performed by matching keywords associated with a project. Additionally, weights can perhaps be utilized to further refine the matching process.

After the matching operation 150, the electronic timesheet is filled at operation 160. At operation 170, the filled in timesheet is verified and changed, if necessary. To further detail operation 170, first a verification operation 180 is performed wherein the matches of operation 150 are checked for accuracy. If no corrections are required, method 110 ends at operation 210. If corrections are required, changes are performed at operation 190 and then a data learning system is utilized, at operation 200, to learn from the corrections. By learning from the corrections, a probability of matching calendar entries to associated projects can be improved. In one embodiment, the data learning system of operation 200 could be implemented with a "bayesian network algorithm". A bayesian network algorithm is similar to a technique for identifying incoming e-mail spam. Unlike other filtering techniques that look for spam-identifying words in subject lines and headers, a Bayesian filter uses the entire context of an e-mail when it looks for words or character strings that will identify the e-mail as spam. Another difference between a Bayesian filter and other content filters is that a Bayesian filter learns to identify new spam the more it analyzes incoming e-mails. After operation 200, method 110 ends at operation 210.

Figure 4:
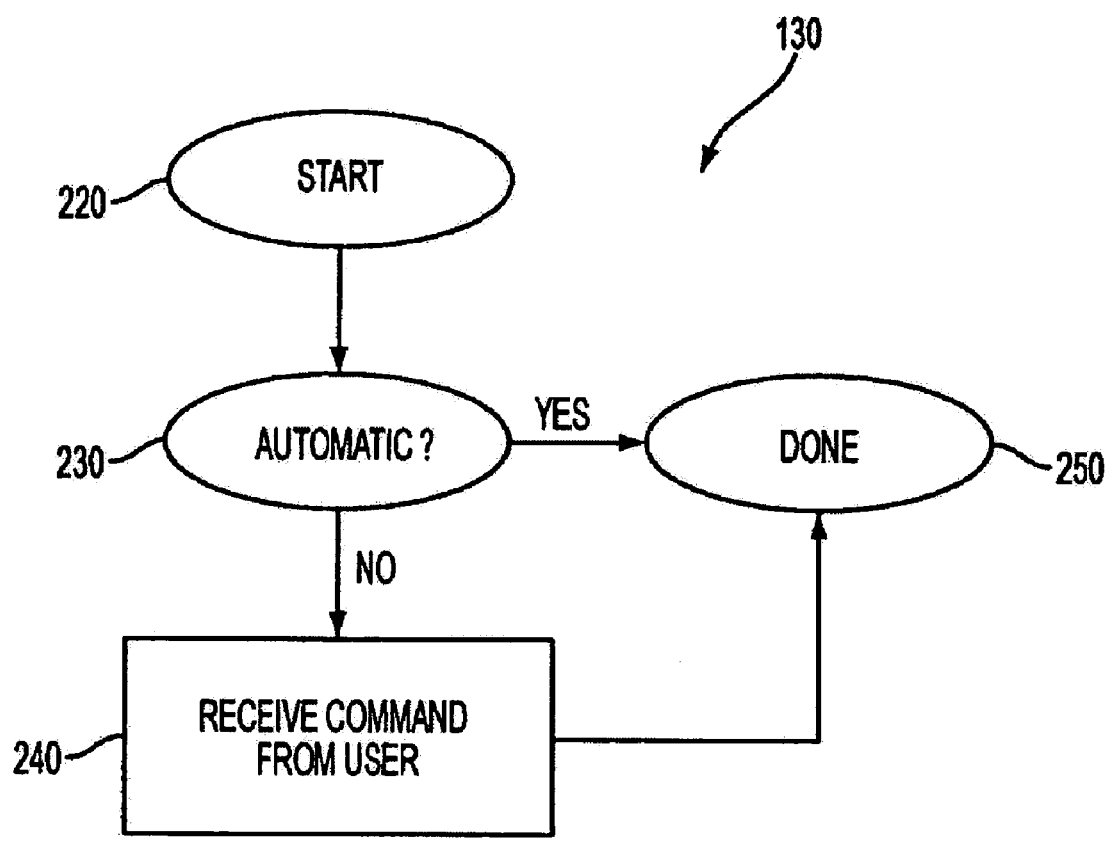
FIG. 4 is a flowchart further illustrating operation 130 of FIG. 3, in accordance with the present invention.

FIG. 4 is a flowchart further illustrating operation 130 of FIG. 3, in accordance with the present invention. After a start operation 230, it is determined at operation 230 if filling the timesheet will be done automatically. If no, operation 240 waits for an employee/user to initiate the process. If yes, the timesheet will be filled at the preset time. The process then ends at operation 250.

Figure 5:
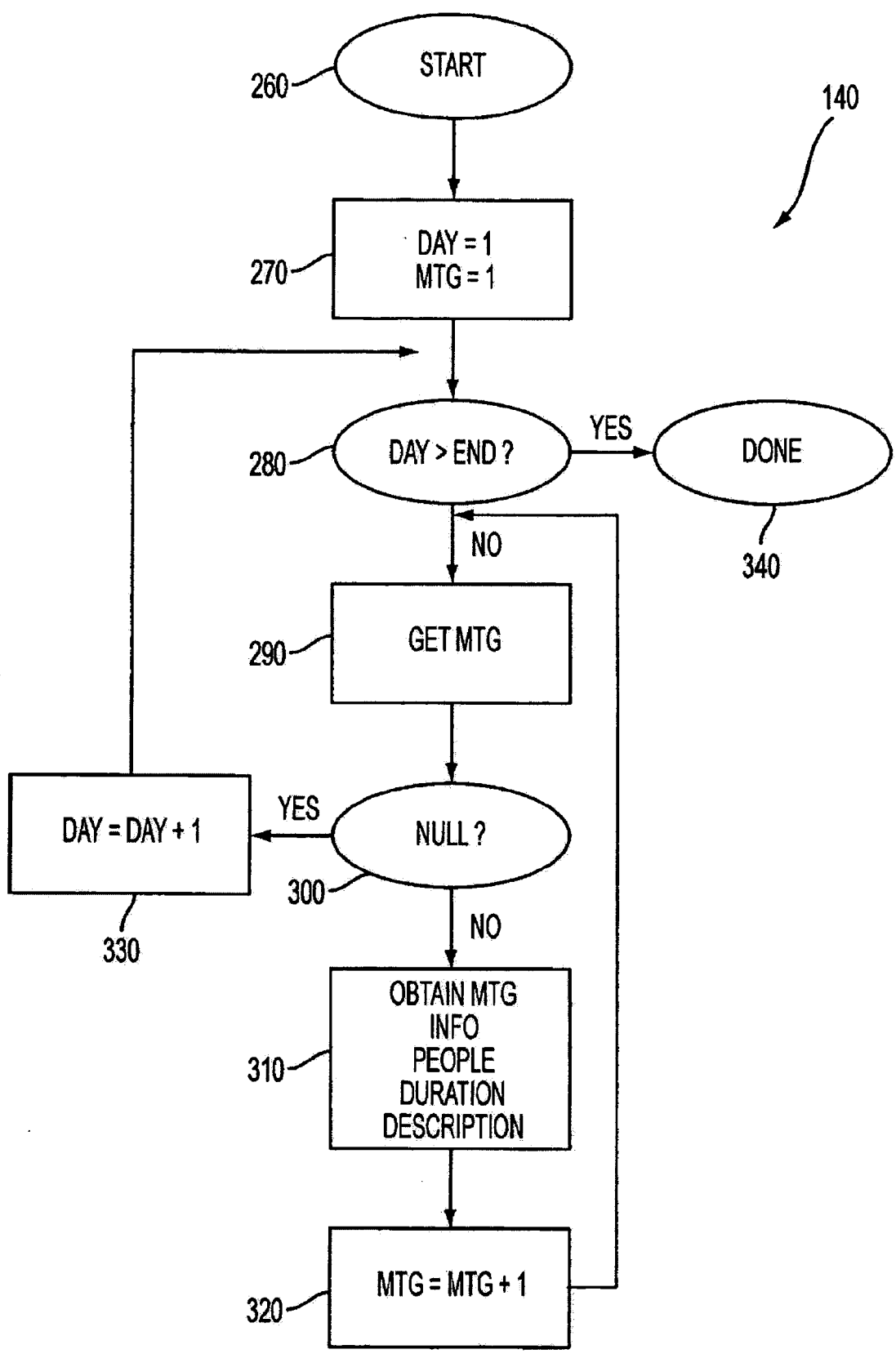
FIG. 5 is a flowchart further illustrating operation 140 of FIG. 3, in accordance with the present invention.

FIG. 5 is a flowchart further illustrating operation 140 of FIG. 3, in accordance with the present invention. Operation 140 extracts calendar entries from an electronic calendar. After a start operation 260, day and meeting ("MTG") parameters are initialized to 1, at operation 270. Operation 280 determines if the end of the week on the calendar has been looped through. If no, the first meeting/calendar entry is obtained at operation 290 and a null check is performed at operation 300. If not empty, the meeting information is extracted and the meeting counter is incremented at operations 310 and 320. Meeting information will usually include attendees, duration, description and location. The next meeting for the current day will then be extracted until all the meetings of the day have been accounted for. The next day will be selected at operation 330 and the meetings for that day will then be extracted. Once all the meetings in a workweek or any other preset time period are extracted, the process finishes at operation 340.

The process of how calendar entries are matched to projects will now be detailed. FIG. 6 is a block diagram 350 illustrating weighted keywords of a project, in accordance with the present invention. For a given project, numerous words can used to positively identify that project. Typically these words will be used in a calendar entry pertaining to a given project. Some examples include name of a project, associated keywords, duration of the calendar entry/meeting, participants and location. Each word is given a weight (W) and a score (S). When a calendar entry is extracted, the appropriate words are searched for. When located, their weight and score are multiplied together. Each word product is then added up to obtain a total project number score ($S_{PN}$). The project with the most associated words, as determined by the project number score, is determined to be the selected project. If it turns out the match was incorrect, the various weights and scores can be modified.

Figure 7:
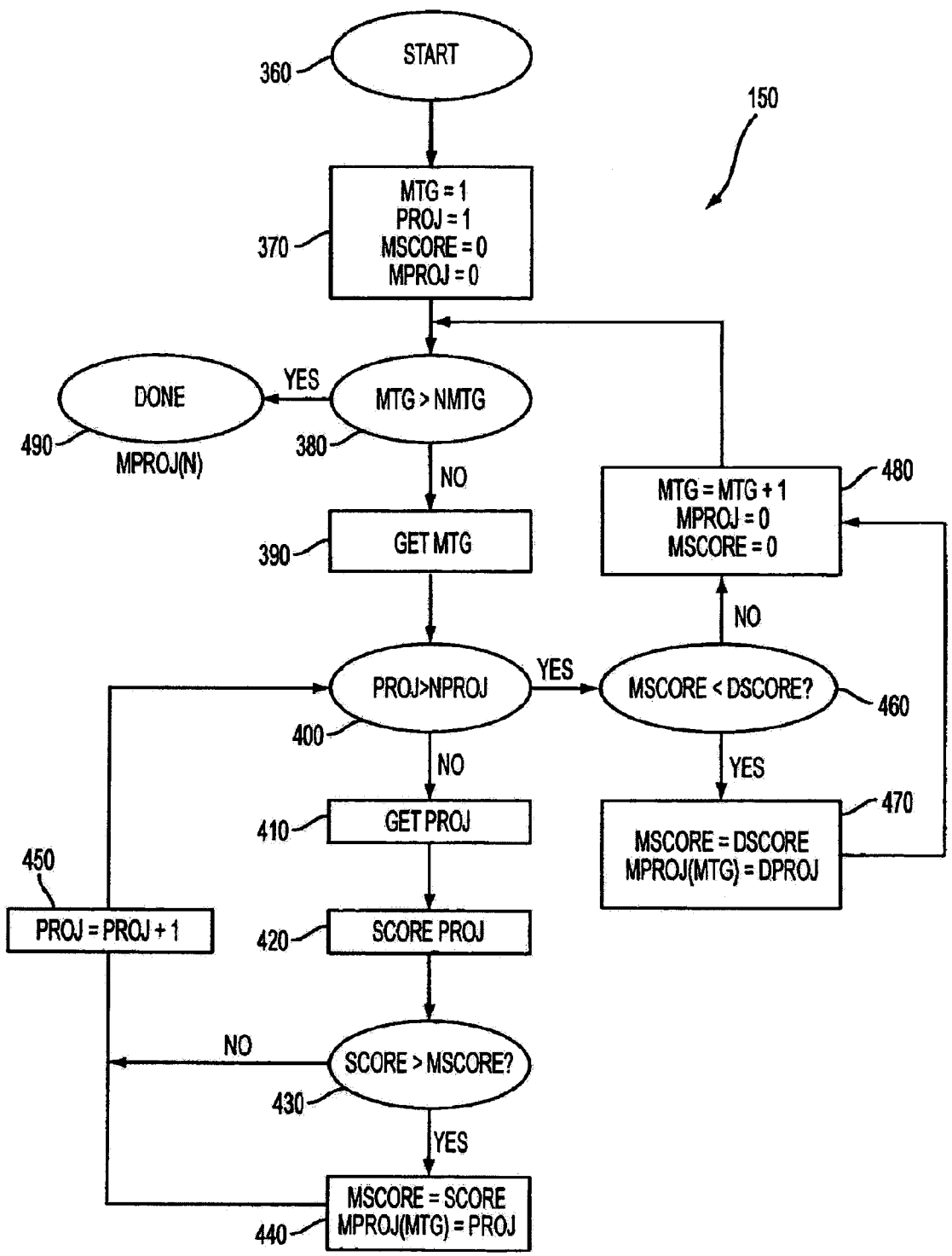
FIG. 7 is a flowchart further illustrating operation 150 of FIG. 3, in accordance with the present invention.

FIG. 7 is a flowchart further illustrating operation 150 of FIG. 3, in accordance with the present invention. As previously stated, operation 150 matches calendar entries to projects. After a start operation 360, various parameters are initialized at operation 370. MTG (meeting) and PROJ (project) are set equal to 1 while $M_{SCORE}$ (maximum score) and $M_{PROJ}$ (maximum projects) are set equal to zero. Operation 380 determines if the current value of MTG is greater than the total number of meetings ("NMTG"). If no, the first meeting/calendar entry is retrieved and the current value of PROJ is checked against the total number of projects ("NPROJ"), at operations 390 and 400. If PROJ is greater in value than NPROJ, then the first project number is retrieved and scored, at operations 410 and 420. If the score of project is less than $M_{SCORE}$, at operation 420, then $M_{SCORE}$ is set equal to the value of the score of project and $M_{PROJ}$(MTG) is set equal to the current value of PROJ, at operations 430 and 440. If the score of the project is less than $M_{SCORE}$ then operation 440 is skipped. Operation 450 increments the current project by 1, at operation 450.

Referring back to operation 400, if the current PROJ incremental value is greater than the total number of projects (NPROJ), then it is determined if $M_{SCORE}$ is less than $D_{SCORE}$, at operation 460, then the value of $M_{SCORE}$ is set equal to that $D_{SCORE}$ (default score) and $M_{PROJ}$(MTG) is set equal to $D_{PROJ}$ (default project), at operation 470. $D_{SCORE}$ is the score below which the result is not meaningful enough: if a meeting doesn't get any project with a score higher than $D_{score}$, then it is assigned the default project $D_{PROJ}$ (one of the projects of the project list is flagged as the default project, e.g. the project on which the employee spends the most time). After operation 470 and also if operation 460 is false, operation 480 will be executed wherein MTG is incremented and $M_{PROG}$ and $M_{SCORE}$ are re-initialized to zero. If all the meetings have been processed at this point, then the process is over at operation 490. In this manner, each calendar entry/meeting will be compared with each project. The project/meeting pair with the highest score will be the selected match used to fill an electronic timesheet.

The verification, correction and learning aspects of the present invention will now be discussed in the following sections. FIG. 8 is an example of an email message used to correct a filled-in electronic timesheet, in accordance with an embodiment of the present invention. After the timesheet is filled in, message 500 can be sent to an employee. Message 500 includes a section 510 that lists entries from the filled-in timesheet. If anything does not look quite right, a correction process can be initiated by pressing the correct button 520. One skilled in the art will recognize that this is merely an exemplary mechanism for alerting an employee about the matched entries and allowing for them to be corrected. As such, various other methods could be utilized and still realize the same result.

Figure 9:
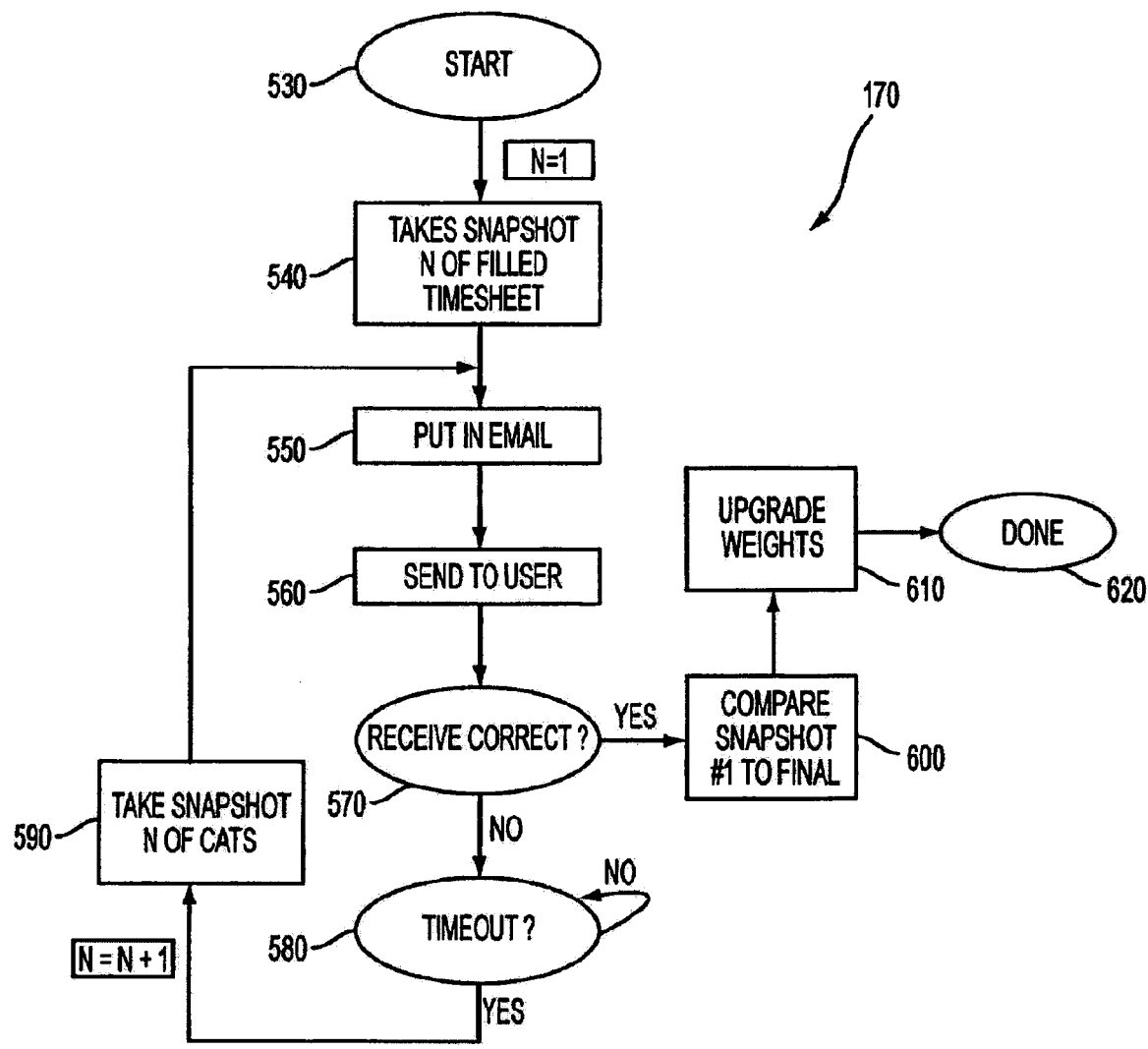
FIG. 9 is a flowchart further illustrating operation 170 of FIG. 3, in accordance with the present invention.

FIG. 9 is a flowchart further illustrating operation 170 of FIG. 3, in accordance with the present invention. As previously stated, operation 170 involves verifying the filled-in timesheet, correcting it and learning from the corrections. After a start operation 530, a first snapshot is taken of the filled timesheet, at operation 540. The snapshot is then sent to the employee via an email message at operations 550 and 560. If no corrections are required or alternatively the employee does not respond, at operations 570 and 580, then another snapshot of the timesheet is taken—after the next cycle of filling in the timesheet, at operation 590.

After the next snapshot is taken, the employee is again presented with an opportunity to correct the filled-in timesheet, at operations 550 and 560. This time the employee does issue corrections at operation 570 and the current snapshot is compared to the corrected timesheet, at operation 600. Based on the differences between the snapshot and the corrected timesheet, weights of keywords can be adjusted in order to improve the matching process, at operation 620. The process then finishes at operation 620.

Figure 10:
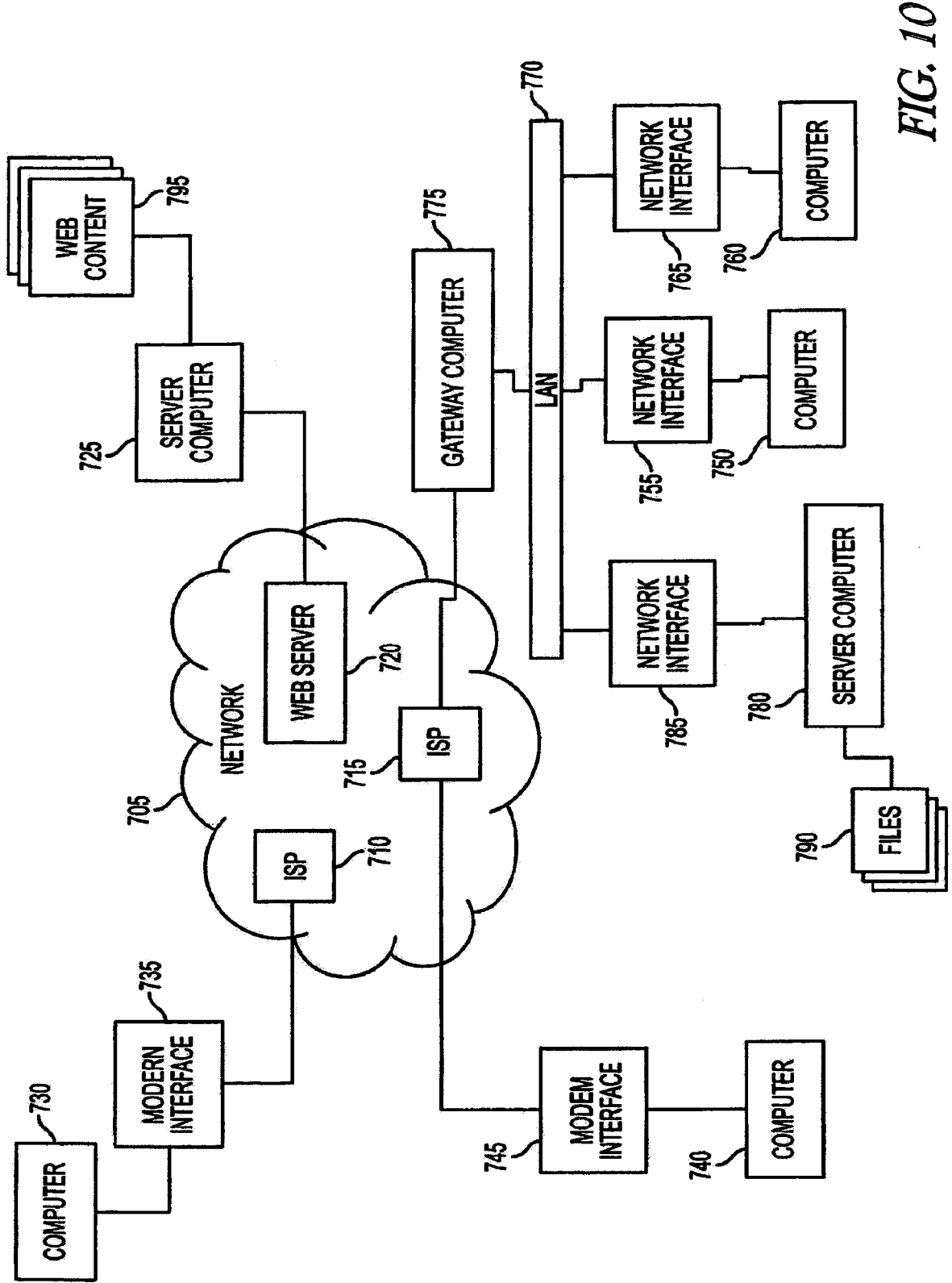
FIG. 10 is a block diagram of an embodiment of a network, system and apparatus used to implement an embodiment of the present invention.
Figure 11:
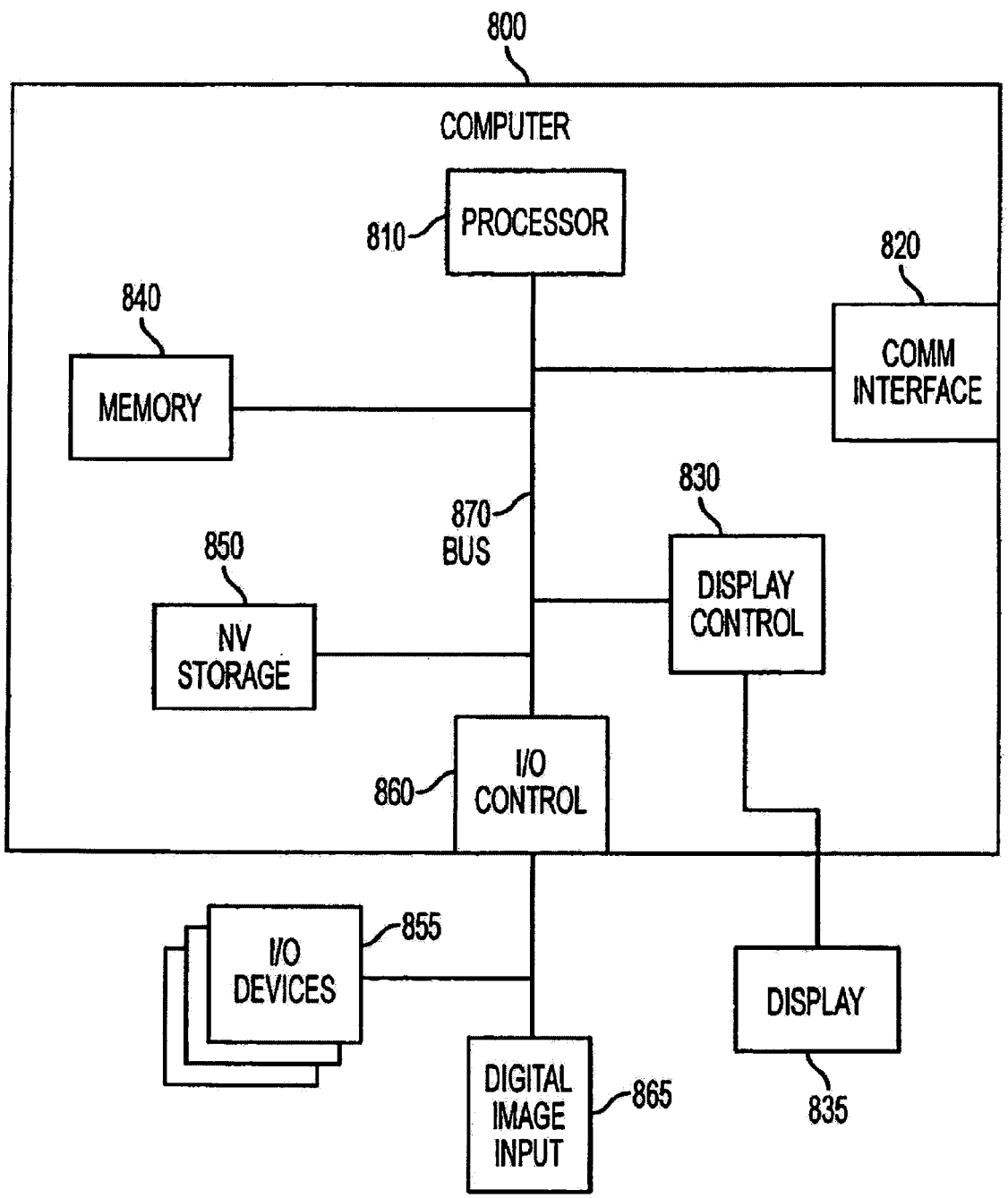
FIG. 11 is a block diagram of an embodiment of a computer used to implement the present invention.

The following description of FIGS. 10-11 is intended to provide an overview of computer hardware and other operating components suitable for performing the methods of the invention described above, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 10 is a block diagram of an embodiment of a network—such as the Internet, system and apparatus used to implement an embodiment of the present invention. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 705 is typically provided by Internet service providers (ISP), such as the ISPs 710 and 715. Users on client systems, such as client computer systems 730, 740, 750, and 760 obtain access to the Internet through the Internet service providers, such as ISPs 710 and 715. Access to the Internet allows users of the client computer systems to exchange information, receive and send e-mails, and view documents, such as documents which have been prepared in the HTML format. These documents are often provided by web servers, such as web server 720 which is considered to be "on" the Internet. Often these web servers are provided by the ISPs, such as ISP 710, although a computer system can be set up and connected to the Internet without that system also being an ISP.

The web server 720 is typically at least one computer system which operates as a server computer system and is configured to operate with the protocols of the World Wide Web and is coupled to the Internet. Optionally, the web server 720 can be part of an ISP which provides access to the Internet for client systems. The web server 720 is shown coupled to the server computer system 725 which itself is coupled to web content 795, which can be considered a form of a media database. While two computer systems 720 and 725 are shown in FIG. 10, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides Internet connectivity to the client computer system 730 through the modem interface 735 which can be considered part of the client computer system 730. The client computer system can be a personal computer system, a network computer, a Web TV system, or other such computer system.

Similarly, the ISP 715 provides Internet connectivity for client systems 740, 750, and 760, although as shown in FIG. 10, the connections are not the same for these three computer systems. Client computer system 740 is coupled through a modem interface 745 while client computer systems 750 and 760 are part of a LAN. While FIG. 10 shows the interfaces 735 and 745 as generically as a "modem," each of these interfaces can be an analog modem, ISDN modem, cable modem, satellite transmission interface (e.g. "Direct PC"), or other interfaces for coupling a computer system to other computer systems.

Client computer systems 750 and 760 are coupled to a LAN 770 through network interfaces 755 and 765, which can be Ethernet network or other network interfaces. The LAN 770 is also coupled to a gateway computer system 775 that can provide firewall and other Internet related services for the local area network. This gateway computer system 775 is coupled to the ISP 715 to provide Internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the Internet through the gateway system 775.

FIG. 11 is a block diagram of an embodiment of a computer used to implement the present invention and can be used as a client computer system or a server computer system or as a web server system. Such a computer system can be used to perform many of the functions of an Internet service provider, such as ISP 710. The computer system 800 interfaces to external systems through the modem or network interface 820. It will be appreciated that the modem or network interface 820 can be considered to be part of the computer system 800. This interface 820 can be an analog modem, ISDN modem, cable modem, token ring interface, satellite transmission interface (e.g. "Direct PC"), or other interfaces for coupling a computer system to other computer systems.

The computer system 800 includes a processor 810, which can be a conventional microprocessor such as an Intel Pentium microprocessor or Motorola Power PC microprocessor. Memory 840 is coupled to the processor 810 by a bus 870. Memory 840 can be dynamic random access memory (DRAM) and can also include static RAM (SRAM). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well-known technology. A digital image input device 865 can be a digital camera which is coupled to an I/O controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to this embodiment, but it may lack some of the features shown in FIG. 10, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to apparatus for performing the operations herein. This apparatus may be specially constructed for the required purposes, or it may comprise a general-purpose computer selectively activated or reconfigured by a computer program stored in the computer. Such a computer program may be stored (embodied) in a computer (machine) readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 12:
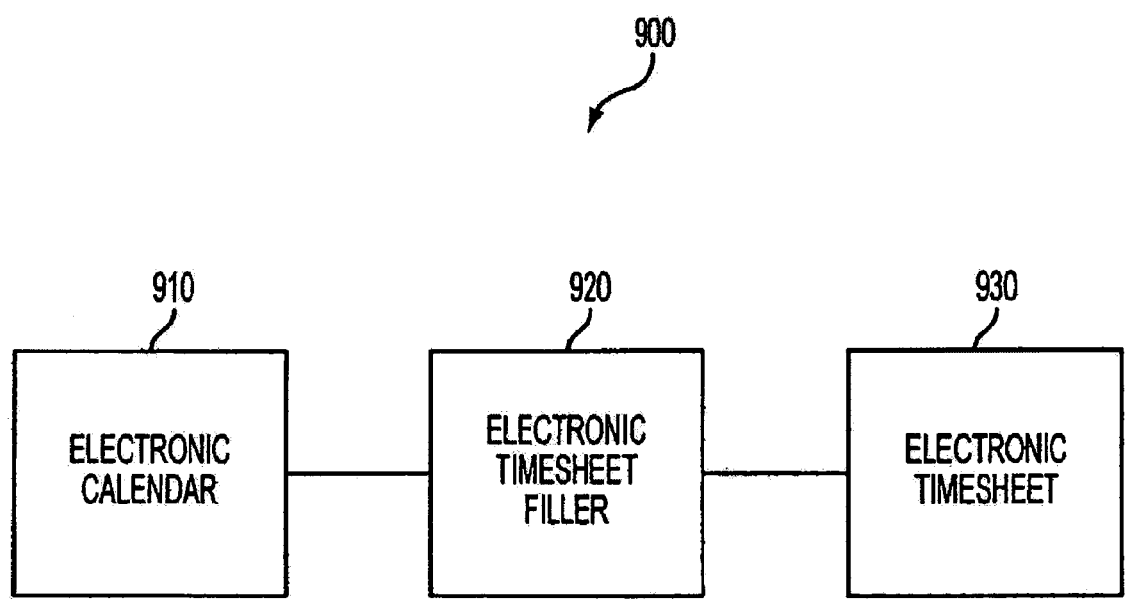
FIG. 12 is a block diagram of an automatic electronic timesheet filler system, in accordance with another embodiment of the present invention.

FIG. 12 is a block diagram of an automatic electronic timesheet filler system 900, in accordance with another embodiment of the present invention. Included in system 900 is an electronic calendar 910, an electronic timesheet filler 920 and an electronic timesheet 930. The electronic calendar 910 contains one or more calendar entries and the electronic timesheet 930 is used for recording time entries pertaining to one or more projects. The automatic electronic timesheet filler 920 retrieves the one or more calendar entries, matches each calendar entry of the one or more calendar entries to a corresponding project of the one or more projects and fills the electronic timesheet based on the matched calendar entry and corresponding project.

The timesheet filler 920 utilizes weighted keywords contained in a calendar entry to assist with matching the calendar entry to the correct project. Furthermore, a user can make corrections to the matching and the timesheet filler. The timesheet filler can also learn from the correction to properly match the calendar entry to the correct project in a later timesheet filling session. This learning process can be accomplished by adjusting weights on the keyword. In another embodiment, the learning process can be achieved using a bayesian network algorithm.

This invention potentially allows for automatically filling an electronic timesheet based on entries in an electronic calendar. Since an employee would no longer need to duplicate records in a calendar and a timesheet, valuable time is freed up to pursue more productive activities.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention

What is claimed is:

1. A method to fill automatically an electronic timesheet, the method comprising:
    extracting one or more calendar entries from an electronic calendar;
    matching each calendar entry of the one or more calendar entries to a corresponding project of a list of projects;
    filling the electronic timesheet based on each calendar entry matched with the corresponding project; and
    verifying the electronic timesheet;
        correcting the electronic timesheet if the electronic timesheet is not accurate; and
        increasing a probability of correctly matching each calendar entry of the one or more calendar entries to the corresponding project of the list of projects based on the corrected electronic timesheet.

2. The method as recited in claim 1, wherein the extracting of the one or more calendar items is preceded by checking to see if it is time to fill the electronic timesheet.

3. The method as recited in claim 1 wherein the increasing of the probability of correctly matching each calendar entry of the one or more calendar entries to the corresponding project of the list of projects based on the corrected electronic timesheet is accomplished utilizing a bayesian network algorithm.

4. The method as recited in claim 1 wherein the matching of each calendar entry of the one or more calendar entries to the corresponding project of the list of projects is accomplished by a weighted keyword score.

5. The method as recited in claim 4 wherein the weighted keyword score is calculated by multiplying a weight of each keyword located in each calendar entry by an associated score and adding up the product of each multiplied keyword.

6. The method as recited in claim 5 wherein the increasing of the probability of correctly matching each calendar entry of the one or more calendar entries to the corresponding project of the list of projects is accomplished by adjusting a weight of one or more keywords.

7. A system for automatically filling an electronic timesheet, the system comprising:
    an electronic calendar containing one or more calendar entries;
    an electronic timesheet for recording time entries pertaining to one or more projects; and
    an automatic electronic timesheet filler receives the one or more calendar entries, matches each calendar entry of the one or more calendar entries to a corresponding project of the one or more projects and fills the electronic timesheet based on the matched calendar entry and corresponding project, wherein the automatic electronic timesheet filler utilizes a weighted keyword score to match each calendar entry of the one or more calendar entries to the corresponding project of the list of projects.

8. The system as recited in claim 7 wherein the automatic electronic timesheet filler determines whether it is time to fill the electronic timesheet.

9. The system as recited in claim 7,
wherein the automatic electronic timesheet filler increases a probability of correctly matching each calendar entry of the one or more calendar entries to the corresponding project of the list of projects based on the corrected electronic timesheet.

10. The system as recited in claim 9 wherein the automatic electronic timesheet filler utilizes a bayesian network algorithm.

11. The system as recited in claim 7 wherein the automatic electronic timesheet filler calculates the weighted keyword score by multiplying a weight of each keyword located in each calendar entry by an associated score and adding up the product of each multiplied keyword.

12. The system as recited in claim 11 wherein the automatic electronic timesheet filler increases the probability of correctly matching each calendar entry of the one or more calendar entries to the corresponding project of the list of projects by adjusting a weight of one or more keywords.

13. A method for automatically filling an electronic timesheet comprising:
    extracting one or more calendar entries from an electronic calendar;
    matching each calendar entry of the one or more calendar entries to a corresponding project of a list of projects;
    filling the electronic timesheet based on each calendar entry matched with the corresponding project;
    taking a snapshot of the electronic timesheet;
    verifying the electronic timesheet;
    correcting the electronic timesheet if the electronic timesheet is not accurate;
    taking an additional snapshot of the electronic timesheet;
    comparing the snapshot to the additional snapshot; and
    adjusting weights of one or more keywords if a difference between the snapshot to the additional snapshot exists.

14. The method as recited in claim 13 wherein extracting the one or more calendar items is preceded by checking to see if it is time to fill the electronic timesheet.

15. The method as recited in claim 13 wherein the verifying and the correcting of the electronic timesheet is accomplished via an email message.

* * * * *